United States Patent [19]

Melugin et al.

[11] 4,384,410

[45] May 24, 1983

[54] PRECISION HYDROSTATIC LEVELLING SYSTEM

[75] Inventors: Dwayne R. Melugin, Carl Junction, Mo.; Bernard B. Karstens, Eureka Springs, Ark.

[73] Assignee: DRM Industries, Inc., Webb City, Mo.

[21] Appl. No.: 287,258

[22] Filed: Jul. 27, 1981

[51] Int. Cl.³ .............................................. G01C 5/04
[52] U.S. Cl. ...................................... 33/367; 33/378; 73/722; 73/728
[58] Field of Search ............ 33/367, 365, 378, 147 C, 33/172 C, 377; 200/83 A, 83 J, 83 L, 83 R; 73/713, 722, 728, 305, 306, 309, 313, 322, 319

[56] References Cited

U.S. PATENT DOCUMENTS

| | | | |
|---|---|---|---|
| 2,438,758 | 3/1948 | Leach | 33/367 |
| 3,109,908 | 11/1963 | Clason | 200/83 L |
| 3,645,135 | 2/1972 | Hadley | 33/367 |
| 3,949,484 | 4/1976 | Cluley et al. | 33/367 |
| 3,967,504 | 7/1976 | Akeley | 73/722 |
| 4,026,156 | 5/1977 | Bowditch et al. | 33/377 |
| 4,087,920 | 5/1978 | Huggett et al. | 33/367 |
| 4,148,313 | 4/1979 | Bird et al. | 200/83 L |
| 4,174,638 | 11/1979 | Zabler et al. | 73/728 |
| 4,217,779 | 8/1980 | Nasuda et al. | 73/313 |

FOREIGN PATENT DOCUMENTS 1145400 3/1963 Fed. Rep. of Germany .... 200/83 L

Primary Examiner—Willis Little

[57] ABSTRACT

There is disclosed a hydrostatic leveling system including a pair of indicator heads connected by a liquid hose for equilizing static pressure in the liquid mercury pools of the indicator heads and a gas hose for equalizing the gas or vapor pressure within the heads above the pools of mercury. Each head is a float connected to the stem of a precision measuring gauge with graduations on the order of ten-thousandths of an inch. The indicator heads have identical structures and thus when they are resting on a level surface they may be reversed in location without change in gauge indicator reading; any difference in the reading is a measure of out-of-level condition. The space for the pool is sealed with a very flexible diaphragm between the float and the wall of the pool cavity. A plunger in the cavity is operated by a solenoid in the cavity to periodically thump the float to reduce tendency to stick due to surface tension, friction and hysteresis. A timer and power supply for the solenoids is located in a control box coupled to the fluid hose which has a metal conductor running therethrough for one conductor to the solenoid and the other conductor is provided by the mercury in the hose.

17 Claims, 5 Drawing Figures

PRECISION HYDROSTATIC LEVELLING SYSTEM

The present invention relates to leveling systems and particularly leveling systems which rely on hydrostatic pressure and the fact that "water (any fluid) seeks its own level". This principle is utilized in a U-tube manometer where, in the absence of some applied force or pressure, the liquid level in the two arms of the U-tube will be at the same level. Even if the two arms of the U-tube were separated by a substantial distance the liquid level would be the same in each tube. That is, a line drawn between the upper surfaces of the liquid two arms would be "level". In discussing or defining the term "level" one may become involved in discussion of distances from the center of the earth, vectors, gravitational fields and the like, but for simplicity and clarity in this discussion "level" will be understood in the simple sense that each point on the surface of a still pool of liquid is "level" with respect to each other point.

The extended U-tube arrangement mentioned above has been utilized as a level finding device, but it has not found wide usage and it has not been capable of providing anything approaching high precision. Apparatus according to the invention on the other hand provides a precision hydrostatic leveling system which is capable of resolving out-of-level measurements to one one-thousandth of an inch or better over substantial distances up to 100 feet or more. The apparatus includes a pair of identical indicator heads with pools of mercury connected by a flexible hose; each head has a float coupled to the stem of a precision gauge with an indicator reading in ten-thousandths of an inch (or comparable metric units). A precision level according to the invention will find use in connection with installing or operating large machine tools, pieces of precision equipment, or precision instruments. It may be employed with lasers which then will greatly extend measurement range. The precision leveling system of the present invention is far more precise than commonly used arrangements such as transits which basically involve use of a bubble level coupled to an accurate optical system.

In addition to taking advantage of the inherent accuracy of the hydrostatic leveling technique, the present invention provides additional features which greatly reduce or eliminate errors that might be caused by friction, surface tension, etc. In particular, the apparatus of the invention includes a thumper mechanism causing a small weight in the float to strike the top or bottom periodically producing damped oscillations to reduce indicator errors due to friction, surface tension, or the like. In addition to the mercury tube connecting the two indicator heads, a vapor tube is provided connecting the space above the mercury pool in each head to the corresponding space in the other head to assure that there is no difference in vapor pressure above the respective mercury pools which could cause the pool levels to differ. At the same time the apparatus prevents escape of mercury vapor which could occur if the space above the mercury pool were vented to the atmosphere.

The base of the indicator head is provided with a magnetic attracter device to cause the indicator head to be held down very firmly (with a force of 30 to 100 pounds, for example) on a ferro-magnetic metal surface on which it is placed. The magnetic attracter device breaks any air film which might exist between the base of the indicator head and the surface on which it rests; because of the high precision on the order of one thousandth of an inch, even an air film under the indicator base could produce a significant error.

Although liquids other than mercury could be utilized in apparatus according to the present invention, the characteristics of mercury with its very high density contribute to the precision of the system.

A columnar extension from the bottom of the float provides a substantial portion of the buoyancy for the float and also resides in a small diameter well in the bottom of the mercury pool thereby maintaining the centered relationship of the float in the presence of lateral forces which might damage the internal mechanism or the gauge stem.

In addition to providing the features and advantages described above it is an object of the present invention to provide a precision hydrostatic leveling system wherein a pair of leveling heads interconnected by a hose contain connected pools of mercury with floats therein and precision gauges for indicating the position of the float within the head with an accuracy better than one thousandth of an inch.

It is another object of the present invention to provide such a system with an electro-magnetic thumper which periodically causes the float to oscillate in the mercury pool with a damped oscillation that may be observed to assure a consistent reading of the gauge indicator free from effects or friction, surface tension, etc.

It is yet another object of the present invention to provide such a system wherein a vapor tube connects the indicator heads and equalizes the vapor pressure above the mercury pool.

It is a still further object of the present invention to provide such a system wherein the float has a downward extension extending into a well of similar shape thereby preventing large lateral movements of the float and preventing damage to the interior mechanism or the gauge stem.

Other objects and advantages of the present invention will be apparent from consideration of the following description in conjunction with the appended drawings in which.

Figure 1:
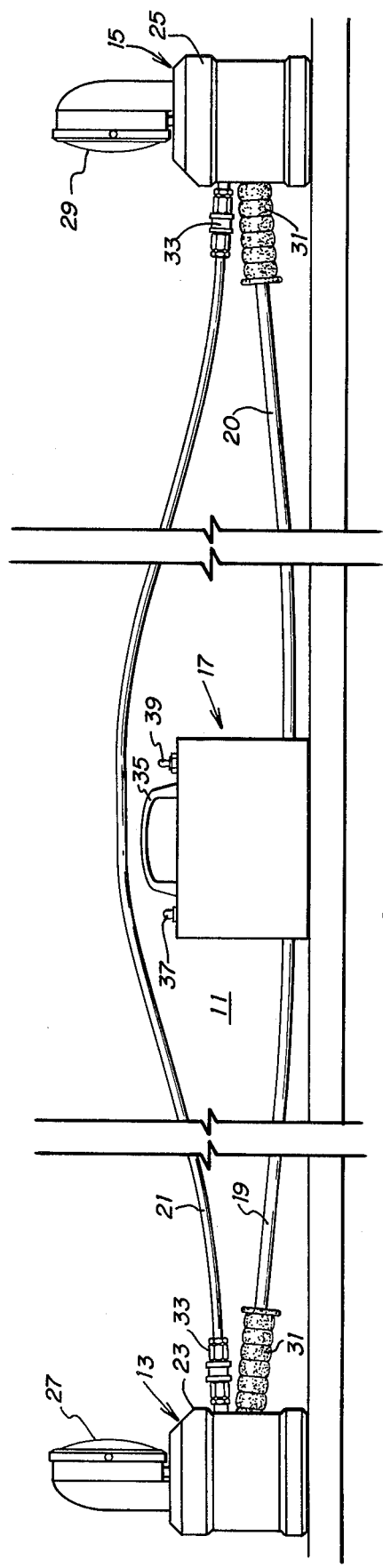
FIG. 1 is an elevational view of a precision hydrostatic leveling system according to the invention.

Referring to the drawings and particularly to FIG. 1, a precision hydrostatic leveling system 11 is shown according to the invention which includes a first indicator head 13 and a second indicator head 15 connected by a hose including segments 19 and 20 passing through a control box 17. Hose 19, 20 is a metal reinforced plastic or rubber hose adapted to hold the mercury working liquid for the system.

Another hose 21 also connects indicator heads 13 and 15 and may be a lighter weight hose for gas containment and equalizes the vapor pressure in the two indicator heads 13 and 15.

Indicator head 13 includes a metal housing 23 formed of steel or other rugged material, and a gauge indicator 27 in the form of a standard gauge indicator capable of measuring dimensions to at least one thousandth of an inch. Specifically the gauge indicator 27 is graduated in ten-thousandths. Indicator head 15 is identical to indicator head 13 and includes a housing 25 and gauge indicator 29. The dimensions of the critical components of heads 13 and 15 should have matching dimensions to better than one thousandths of an inch; small differences can be compensated by calibration of gauges 27 and 29.

Conventional connectors 31 connect the hose 19 to housing 23 and hose 20 to housing 25. The conductive metal reinforcement of hoses 19 and 20 is conductively connected to housings 23 and 25, respectively, for reasons that will later be explained. Control box 17 contains an electrical power supply and control circuit (schematically shown in FIG. 5), which actuates thumper mechanisms in the floats of the indicator heads 13 and 15 as will later be explained. An indicator lamp 37 is operated simultaneously with the thumper actuators and provides an indication that the control box apparatus 17 is operating properly. A handle 35 is provided for the control box 17, and switch 39 for activating the power supply and control circuits therein.

Figure 2:
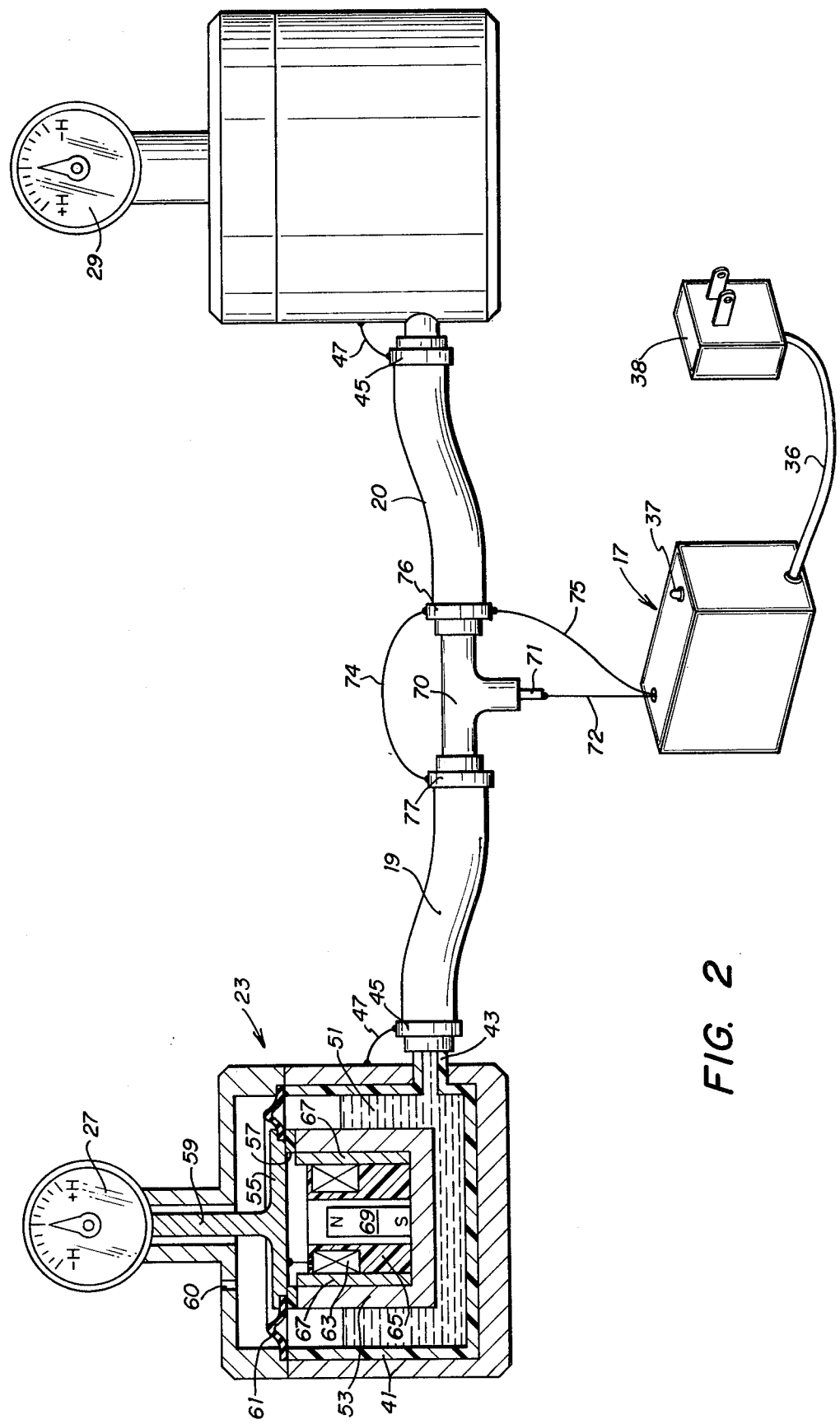
FIG. 2 is a partially schematic illustration of a precision hydrostatic leveling system according to the invention.

A partially schematic diagram useful in explaining the operation of the invention is shown in FIG. 2. Control box 17 may be powered with internal rechargable batteries and provided with a battery charger 38 connected to control box 17 by cord 36.

FIG. 2 shows schematically the connection of hoses 19 and 20 electrically to the control box circuitry of control box 17. Actually it is preferred that the junction of hoses 19 and 20 be inside control box 17 as shown in FIG. 1, but the schematic representation of FIG. 2 is used for simplicity of explanation.

Within metal housing 23 is a cup 41 of electrically nonconductive material which acts as a container for the pool of mercury 51. A fitting 43 on cup 41 connects to hose 19 and forms a passageway for mercury 51 which continues to the other indicator head 15.

Hoses 19 and 20 are connected midway between indicator heads 13 and 15 by a coupling 70 formed of electrically conducted material. An electrical connector 71 on coupling 70 is connected by a lead 72 to the control circuit within control box 17. Lead 72 is therefore an electrical contact with the mercury through connector 71 and coupling 70.

Another lead 75 extends from control box 17 to flanges 76 and 77 which are interconnected by electrical lead 74. Thus two conductive paths are provided from control box 17 to each of the indicator heads 13 and 15, one conductive path being through the metal reinforcing (not shown) in hoses 19 and 20, and the other electrical connection being through the mercury itself.

Flanges 45 on hoses 19 and 20 electrically connect to the metal reinforcement and a lead 47 connects each flange to metal housing 23 or 25.

Float 53 is preferably formed of non-magnetic material such as aluminum alloy or stainless steel alloy. Float 53 has a top portion 55 which is electrically insulated from the remainder of the float by a gasket 57 and is secured to stem 59 of gauge indicator 27. Thus upward and downward movement of float 53 is directly indicated on gauge indicator 27, which in a normal case will read in ten thousandths of an inch. A diaphragm 61 which is very flexible closes the gap between float 53 and cup 41 so that mercury 51 retained within the cup will not find its way into other parts of the mechanism. A vent 60 opens the space above float 53 so that any effect of atmospheric pressure on diaphragm 61 in the two indicating heads is counter-balanced. In the fully developed version of the apparatus a vent is also provided in the space just below diaphragm 61 and the vent is connected by a vapor hose to the opposite indicator head to equalize pressure.

Float 53 has a liner 67 of conductive material within which is a solenoid coil 63 wound on a bobbin 65. A magnet 69 is placed loosely in the hollow core of the solenoid bobbin 65 so that the top of magnet 69 is slightly above the center line of the solenoid coil 63. This causes magnet 69 to be lifted when solenoid coil 63 is energized and upon de-energization magnet 69 drops; as it strikes the top and bottom of float 53 it sets up a short damped vibration, which preferably has a magnitude of a few ten-thousandths of an inch. The direction of current through coil 63 is matched to the polarity of magnet 69 to produce a lifting force thereon. Magnet 69 could be replaced by a soft iron armature in which case either direction of current in coil 63 (or alternating current) would be acceptable. One of the conductive paths for the excitation current for the solenoid coil 63 may be through a lead 81 to conductive liner 67 and to the wall of float 53, which is in contact with mercury 51. The other path may be through a lead 83 to the top portion 55 of float 53 and stem 59 of gauge indicator 27 which is in electrical contact with the housing 23 of indicator head 13.

As previously mentioned head 13 and head 15 are virtually identical and in particular great care is taken to make the important dimensions of the two devices quite nearly identical. As will later be explained, the procedure for their use involves adjustment of gauges 27 and 29 which would accommodate very small dimensional differences on the order of a few thousandths of an inch at most. But one wishes to have the function of the two heads be sufficiently identical to eliminate significant errors arising from differences in the two indicator heads.

The float 53 is of substantial volume, a cubic inch or more, and thus has considerable buoyancy in the very dense mercury liquid. Accordingly, the very slight force from gauge stem 59 on float 53 has an insignificant effect on the flotation level of float 53. Even greater precision is obtained by the thumper mechanism comprising solenoid 63 and magnet 69 which produces a damped oscillation overcoming friction, drag, and surface tension effects on the position of float 53.

A well-known approach to reducing friction or hysteresis in a measuring or indicating system is to subject the system to a decaying sinusoidal excitation superimposed on the signal or quantity which is being measured. While the fundamental principal is old the present procedure and apparatus whereby such a damped oscillation is imparted is novel and produces particularly effective results.

Obviously a great variety of mechanisms might be employed to produce an oscillation of the float 53 which would then be allowed to decay to a position accurately representative of the mercury liquid level. For example a motor or vibrator could be utilized to vibrate the float through some physical contact or through stem 59. The internal electro-magnetic thumper provided by the present invention is notably more effective than such a motor driven vibrator mechanism.

The electro-magnetic thumper in the float is very economical with respect to energy usage. It may conveniently have a duty cycle of approximately 0.05 whereas a motor vibrator would require a greater duty cycle.

Furthermore, the thumper utilizes almost all the energy supplied in a short impulse as the magnet 69 strikes the top or bottom of the float 53. Energy consumption is a relevant consideration because it is preferably to operate the apparatus on a small rechargable battery and the low energy consumption contributes to a long period between battery recharges. The battery may be recharged while the system is in use with the charger connected.

Figure 4:
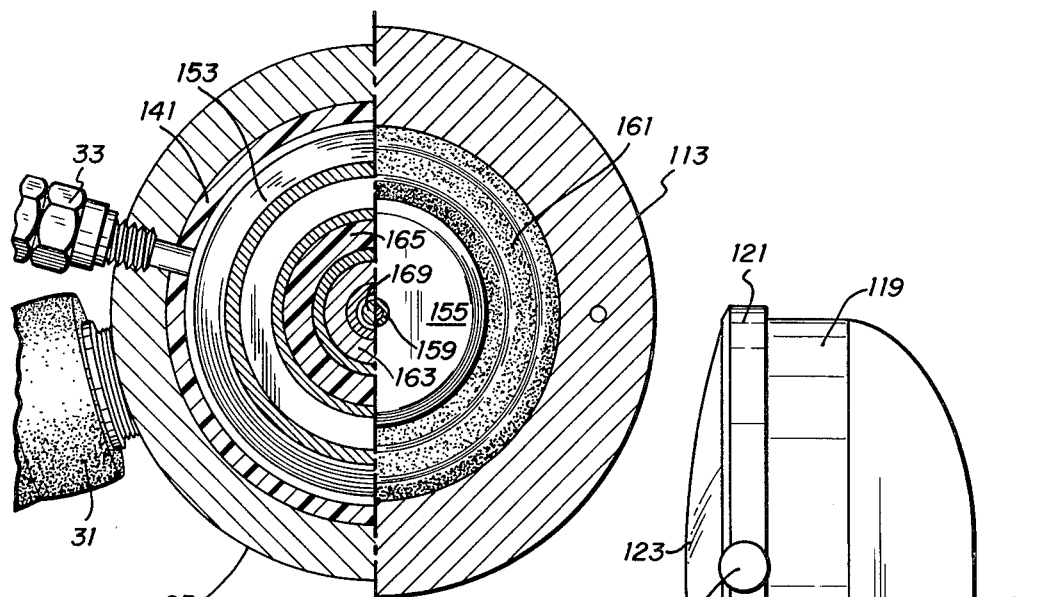
FIG. 4 is a sectional view of the device of FIG. 3 taken along the line 4—4 in FIG. 3.
Figure 3:
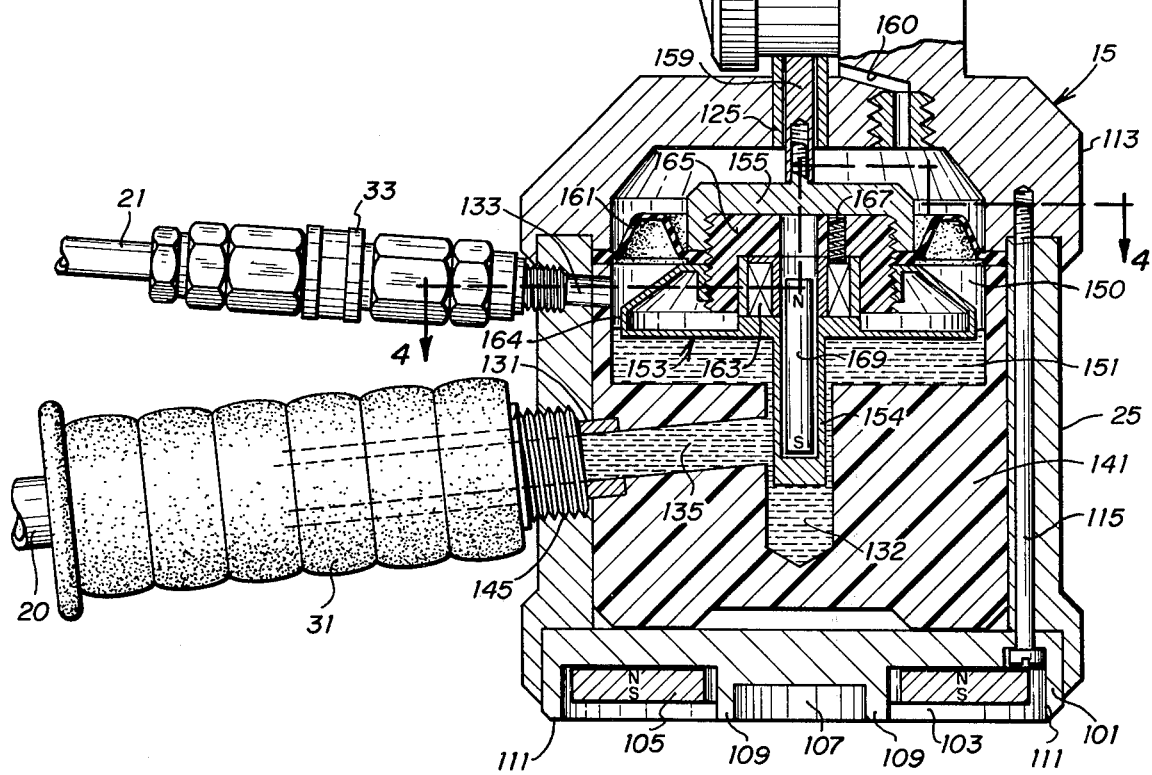
FIG. 3 is an enlarged detailed view of an indicator head as shown in FIG. 1 partially in vertical section.

While the basic operation of the apparatus may be seen from the schematic diagram of FIG. 2, the entire operation of the apparatus will be better understood upon consideration of the detailed drawings of a fully developed device as shown in FIGS. 3 and 4.

In FIGS. 3 and 4 only indicator head 15 is shown, it being understood that indicator head 13 would be identical thereto. In FIG. 1 indicator heads 13 and 15 are shown as left and right handed versions, but this is not necessary and the two indicator heads 13 and 15 may be absolutely identical.

Connected to indicator head 15 is a vapor hose 21 which is secured by a conventional coupling 33. Also connected to indicator head 15 is a mercury hose 20 secured by a coupling 31. Both coupling 33 and coupling 31 may be threadedly engaged in the sidewall of housing 25.

Housing 25 includes a base portion 101 having an annular groove 103 in the bottom thereof in which is secured by adhesive or other means an annular magnet 105 magnetized as indicated in FIG. 3 with a north pole at the top surface and a south pole at the bottom surface. Preferably the center of base 101 has a cylindrical recess 107. Thus when base 101 is set on a flat surface it has relatively small areas of contact represented by an annulus 109 and the rim 111 of base 101. The material of the base is steel or other ferro-magnetic material so that the south pole of magnet 105 strongly attracts a ferro-magnetic surface on which the indicator head 15 is placed. Annulus 109 and rim 111 form flux paths which enhance the attraction due to magnet 105. It has been found that the high precision provided by apparatus according to the invention makes it highly desirable to eliminate an air film which might form between the base of the indicator head 115 and a flat surface on which it is placed. The construction illustrated in FIG. 3 causes a force of approximately 30 pounds to 100 pounds to be produced to attract the rim 111 to a flat ferro-magnet surface on which it is placed; this force is more than adequate to break and eliminate an air film which would be a possible source of error in the indicator reading.

The top of housing 25 is closed by a cover 113 which has integrally formed therewith a mounting post 117. Gauge indicator 29 includes a case 119 which is secured by screws or other suitable means to mounting post 117.

Gauge 29 has a rotatable bezel 121 and a crystal 123 of conventional form. Stem tube 125 extends from the bottom of case 119 and encloses stem 159 which is the movable measuring element of gauge 29. The entire structure of gauge 29 is conventional and has not been shown in detail; it includes a bezel lock screw 127 for rotatable bezel 121.

Stem tube 125 resides in an opening in the cover 113 of indicator head 15 and case 119 and stem tube 125 is securely and immovably fixed to cover 113 of housing 25. Cover 113 and base 101 are secured by a machine bolt 115 (and others not shown) so that the entire external structure of indicator head 15 is a rigid unified body and very rugged.

A liner 141 within housing 25 has a cavity 150 to accommodate a pool of mercury 151. Centered in the liner 141 is a well 132. A hole 131 in housing 25 in which fitting 31 is threadedly engaged connects by a duct to well 132 and thence to the cavity 150 in liner 141.

An opening 133 is provided in housing 25 into which fitting 33 is threadedly engaged. Opening 133 is spaced above hole 131 and may also be spaced circumferentially from hole 131. Opening 133 communicates with the upper portion of cavity 150 above the level of the mercury pool 151.

A float 153 is located within the housing 25 and occupies a portion of the cavity 150. Float 153 has a flotation member 164 with a downward extension 154 which fits with only a small clearance of approximately 0.100 inches in well 132. Flotation member 164 is shown with a hollow interior 154, which of course increases its flotation; however, due to the very high density of mercury most solid metals such as stainless steel will float in the mercury 151 and flotation member 164 may be made solid rather than hollow as shown in FIG. 3. Float 153 includes a core member 165 of plastic, electrically insulating material which threadedly engages with flotation member 164.

Core 165 has a central opening which is enlarged at the lower portion to receive a solenoid 163, the winding of which is brought out to an upper and a lower contact (not shown). The lower contact of solenoid 163 makes electrical contact with flotation member 164 which is in electrical contact with mercury 151. A spring 167 is retained in a hold provided therefore in core 165 and serves to make electrical contact between the upper contact of solenoid 163 and a cap 155 which is threadedly engaged with core 165.

Cap 155 serves to capture the internal rim of an annular diaphragm 161. The outer rim of diaphragm 161 is captured between cover 113 and the bottom portion of housing 25.

Diaphragm 161 is very light and flexible and does not interfer with the motion of float 153. At the same time it prevents escape of mercury or mercury vapor from the cavity in liner 141. Cap 155 has a central threaded extension which permits it to be firmly engaged with the end of gauge stem 159.

It will be seen that the practical embodiment of FIGS. 3 and 4 generally conforms with the schematic illustration in FIG. 2 and will operate in a similar fashion. In FIG. 3 the level of the mercury 151 in liner 141 will correspond very precisely with the level in the opposite indicator head when they are respectively level. Float 153 responds to changes in the level of mercury 151 with a new vertical position which is transmitted by gauge stem 159 and indicator on gauge 29.

In order to minimize the effects of friction the built-in thumper mechanism including magnet 169 and solenoid 163 produces periodic physical impulses which impart a vertical oscillation to float 153 which is rapidly damped, primarily by the fluid damping provided by mercury 151.

The pulse rate for the thumper mechanism is not critical but a rate of approximately one pulse per second is sufficiently rapid to prevent build-up of errors due to friction or hystersis and provides adequate time to read the indicator on gauge 29 after the oscillations (which are visible on the gauge) die out in a fraction of a second. It will be noted that the operator is able to visually observe the fact that friction and hystersis effects are eliminated by the thumper. When both indicator heads are stationary and there is no perturbation of the system the indicators should return to the same reading after each momentary oscillation at intervals of one second. If the indications were not repeatable it would be an indication that some parts of the mechanism were binding or that there was some abnormal friction effect which was interfering with the proper operation of the system.

It will be understood from the drawings and the previous description that the electrical connection to solenoid 163 is made in a manner which exploits the electrical conductivity of mercury 151 so that there are no electrical leads as such which might interfer with the mobility of float 153. One of the two electrical paths to the solenoid 163 is through a contact (not shown) at the bottom of the solenoid and the conductive material of float 153 to the body of mercury 151. The other electrical path is from a contact at the top of the solenoid 163 through spring 167, cap 155, stem 159 and gauge 29 to housing 25. Housing 25 is in electrical contact with the metal nipple 145 of coupling 31. Reinforcement wires or other metal conductors of hose 20 connect electrically to nipple 145 thus completing the path for the electrical impulse operating solenoid 163.

Figure 5:
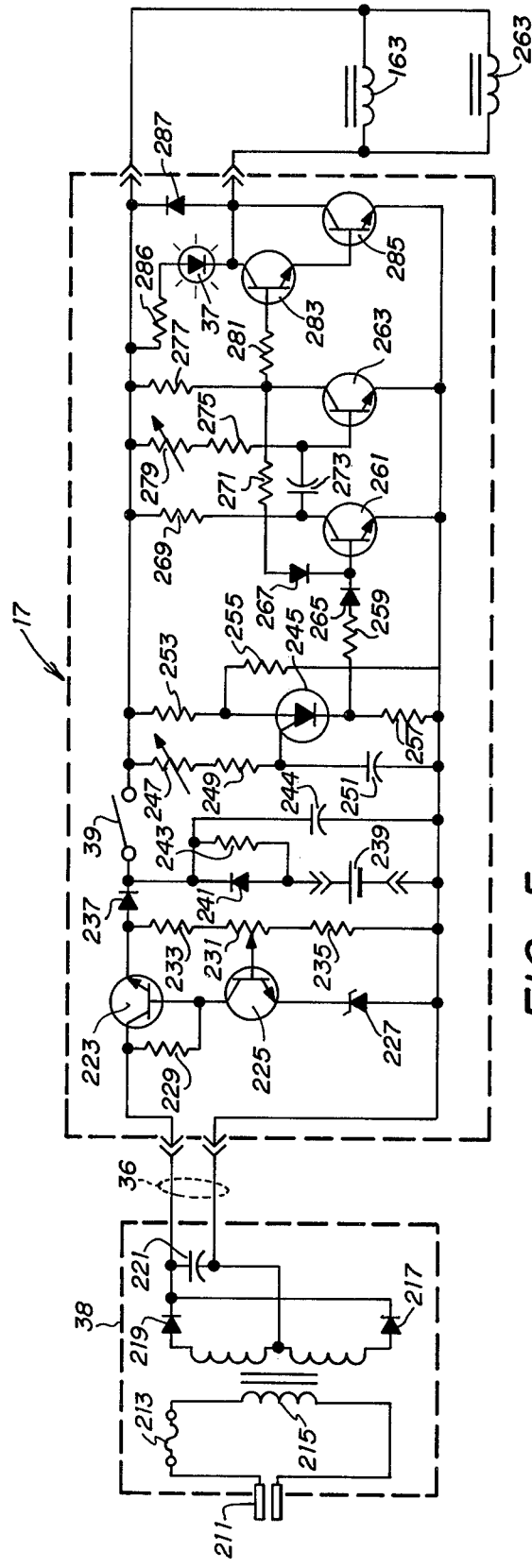
FIG. 5 is a schematic circuit diagram showing the power supply and control circuit for the thumper mechanisms in the indicator heads.

FIG. 5 is a schematic diagram showing the electrical circuit providing control and power for the electromechanical thumpers in the floats of the indicator heads 13 and 15. Battery charger 38 is provided with prongs 211 for insertion into a standard 110 V AC electrical outlet. The primary of a transformer 215 is connected to prongs 211 and a fuse 213 is provided to safely interrupt the circuit if excessive current is drawn. The secondary of transformers 215 is center tapped and a conventional full-wave rectifier circuit including diodes 217 and 219 provide a DC output to cord 36 at a voltage of approximately 18 volts; filter capacitor 221 is connected across the output of battery charger 38. Battery charger 38 and the component circuits of control box 17 are in general conventional circuits which are shown for purposes of illustration. It will be understood that various other conventional circuits may be combined to provide a pulse generator to operate the thumper mechanism.

Voltage regulation is provided by the circuit including transistors 223 and 225, zener diode 227, resistors 229, 233, 235, and potentiometer 231, together with diodes 237 and 241, resistor 243 and capacitor 244. Battery 239 is a 12 V battery and is maintained at the proper charge by the above-described conventional voltage regulator circuit when battery charger 38 is energized and connected to control box 17.

Switch 39 activates the timer circuits for the thumper mechanism. A rate timer circuit is provided by transistor 245, variable resistor 247, resistor 249, capacitor 251, resistors 253, 255, 257, and 259, and diode 265. The repetition rate of the pulses may be adjusted by adjustment of variable resistor 247 and will typically be adjusted to approximately one per second.

A pulse duration circuit includes transistors 261 and 263 with their associated components diode 267, resistors 269, 271, and 275, 277, capacitor 273, and variable resistor 279. Duration of the pulses may be adjusted by adjustment of variable resistor 279 and will typically be set to approximately 50 milliseconds.

A power switching circuit is provided which responds to the signal from the pulse duration circuit and includes transistors 283 and 285, together with resistor 281, and diode 287. Indicator lamp 37 is a light emitting diode connected in series with resistor 286 to give visual indication of the pulse current supplied to the thumper mechanisms. Current pulses from control box 17 are provided under the control of the previously described control circuits to solenoid 163 and its counterpart 263 in indicator head 13.

Operation of the precision hydrostatic leveling system will most easily be understood by reference to a specific example. It will be understood however that the particular calibration of the gauges referred to and other specific details are used for illustration and a wide variety of different gauges with different calibrations could be employed within the scope of the system. Assume that indicator gauge 29 has a needle (not shown in FIG. 3) which moves through one complete rotation in response to a displacement of stem 159 amounting to 0.020 inches. Assume also that there are 200 index marks around the periphery of the gauge so that each mark corresponds to 0.0001 inches and ten such marks correspond to one one-thousandth of an inch. Customarily such a gauge also has a smaller dial with a needle which makes one rotation for many rotations of the indicator needle. Assume that the small needle of gauge 29 makes one rotation for ten rotations of the indicator needle. Thus midscale for the gauge would be with the small needle on five and the large indicator needle on zero; the range would be plus or minus 0.100 inches.

In making the system ready for use one may first place the two indicator heads relatively close together on a flat steel surface which is preferably level within a few thousandths of an inch. Mercury is added, through opening 133 for example, until the readings of the two indicator gauges are approximately mid-range. The needles are then moved to exact zero. The dial zero will be preset to the top of the dial and normally will not be changed. The extent of out-of-level is determined by the difference in the readings of the gauges. The positions of the two indicator heads are exactly reversed.

Then a calibration adjustment may be made by moving the needle of one of the gauges on its shaft. The most expeditious adjustment for achieving proper calibration is to move only one of the two needles to a point half the distance to the position of the other needle. This will cause the average of the two indicator needle readings to differ from zero but this is normal operating procedure since only the difference in the gauge readings is used in determining out-of-level condition.

The above procedure will result in proper calibration so that reversing the position of the indicator heads will cause each head to give a reading equal to the previous reading of the other head. Or, in other words, reversal of the indicator heads will result in the same reading being given at each position notwithstanding the reversal of the indicator heads. In unusual circumstances field calibration may be accomplished by the above procedure except that the bezel would be moved to change a reading rather than moving the needle on its shaft. There normally will be expansion and contraction of the mercury and other changes which will cause the average of the two indicator readings to wander.

Routine initial calibration of the systems may be accomplished by setting up a flat, rigid and stable steel surface level to approximately one ten-thousandths of an inch; two indicator heads placed on such a table should both have the same reading and may be adjusted to produce the desired readings. Factory calibration of the apparatus could be carried out more rapidly by this peocedure.

It should be noted that while the previous description of the precision hydrostatic leveling apparatus has assumed that there would be two indicator heads in the system, it is quite possible to utilize three indicator heads or more. With three indicator heads connected together they could be calibrated two at a time or on a calibration table. A system with three indicator heads would permit a flat two-dimensional surface to be adjusted to level without moving the indicator heads from one position to another. Normally the system with two indicator heads as illustrated herein will be sufficient for any desired precision leveling operation.

The use of the precision hydrostatic leveling system is quite simple and virtually fool-proof. One may wish to check calibration by taking a reading of the two indicators placed close together on a relatively flat surface and checking the readings after the two indicator heads have been reversed. If the readings on the heads are also reversed this indicates correct calibration. Thereafter the indicator heads may be placed in the respective locations for which an out-of-level measurement is desired and the difference between the readings on the two gauges represents the out-of-level conditions. The separation of locations may be as much as 100 feet. If the bezel is set to place the dial zero midway between the two indicator needle readings one need read only one of the two indicator gauges to get a correct reading (of course one reading must be multiplied by two).

Changes in temperature will not affect the operation of the device (though it will cause shift to zero point) so long as the temperature to which all parts of the apparatus, including both indicator heads and connecting hose, is approximately the same. Even if the temperature differs at the position of one of the indicator heads relative to the other, no immediate effect will be produced because of the substantial heat capacity of the mercury and the fact that it is rather well insulated by liner 141. Thus temperature differences at the two measuring points may be tolerated if readings are taken relatively promptly and the indicator heads are placed close together or otherwise maintained at the same temperature between readings. The effect of temperature variations may also be reduced by arranging connecting hoses 19 and 20 to be approximately at the level of the mercury 151; a difference in density in the mercury in hose 19 or 20 will produce little effect on the apparatus except in cases where a non-horizontal portion of the hose creates a vertical column of mercury of non-uniform temperature or density.

It should be understood that the particular mechanical gauge shown in conjunction with the disclosed apparatus is illustrative only and may be replaced with any form of accurate physical measurement gauge. Other forms of mechanical gauges may be employed or electronic digital gauges may be utilized. Electronic gauges may be of the non-contacting variety where there is capacitive, inductive or optical coupling between float 53 and the electronic gauge. Either a mechanical gauge or an electronic gauge may have a digital readout. Electronic gauges may be connected electrically and the difference in float displacements calculated electronically. While it is particularly convenient to use the mercury itself as one electrically conductive path for supplying a current pulse to the electro-mechanical thumper mechanism, very flexible electrical leads may be employed to provide a conductive path to floats 53 or 153.

In addition to the variations and modifications of the invention suggested and described above it will be apparent to those skilled in the art that numerous other variations and modifications may be made to the apparatus according to the invention, and accordingly the scope of the invention is not to be deemed limited to the particular embodiments and variations described or suggested, but rather is to be determined by reference to the appended claims.

What is claimed is:

1. A hydrostatic leveling system comprising,
a first liquid container,
a second liquid container,
a liquid conduit connecting said containers,
a body of liquid filling said containers and conduit,
a float in each of said containers,
a displacement measuring device arranged with each said container to measure the displacement of said float relative to the bottom of said container, and
electro-mechanical means in said container for controllably imparting a motion to said float.

2. Apparatus as recited in claim 1 further including means for restraining said float to permit only substantially vertical movement.

3. Apparatus as recited in claim 1 further including a vapor-tight hose connecting said first and second containers at their upper portions.

4. Apparatus as recited in claim 1 wherein said electro-mechanical means includes an electro-magnet in said float and a movable element arranged to be displaced upon energization of said magnet.

5. Apparatus as recited in claim 4 wherein each said container has a conductive housing and means for electrically insulating said liquid from said conductive housing and said system further includes control means for producing an electric current to energize said magnet and means for providing a first and second conductive path from said control means to said body of liquid and to the conductive housing of each of said containers.

6. Apparatus as recited in claim 5 further including means for restraining said float to permit only substantially vertical movement.

7. A hydrostatic leveling system comprising,
a first liquid container,
a second liquid container,
a flexible liquid conduit connecting said containers,
a body of liquid filling said containers and conduit,
a displacement measuring device arranged with each said container to measure the displacement of the surface of said liquid relative to the bottom of said container,
a vapor-tight hose connecting said first and second containers near the upper portions thereof,
respective means for sealing said liquid in each said container located above the connection point of said vapor-tight hose, and means for momentarily effecting the displacement of the surface of said liquid.

8. Apparatus as recited in claim 7 wherein said displacement measuring device includes a float and electro-mechanical means for controllably imparting a vertical motion to said float.

9. Apparatus as recited in claim 8 wherein said electro-mechanical means includes an electro-magnet in said float and a movable element arranged to be displaced upon energization of said magnet.

10. Apparatus as recited in claim 7 wherein said means for sealing said liquid comprises a vapor-tight substantially non-rigid diaphragm extending between each said float and its respective container wall to seal said liquid and its vapor in said containers.

11. A hydrostatic leveling system comprising,
a first liquid container,
a second liquid container,
a flexible liquid conduit connecting said containers,
a body of liquid filling said containers and conduit,
a float in each of said containers,
means for restraining said float to permit only substantially vertical movement,
a displacement measuring device arranged with each said container to measure the displacement of said float relative to the bottom of said container,
a vapor-tight, flexible diaphragm extending between each said float and its respective container wall to seal said liquid and vapor therefrom in said containers, and
electro-mechanical means in said container for controllably imparting a vertical motion to said float.

12. Apparatus as recited in claim 11 further including a vapor-tight hose connecting said first and second containers at their upper portions below said diaphragm.

13. Apparatus as recited in claim 11 wherein said electro-mechanical means includes an electro-magnet in said float and a movable element arranged to be displaced upon energization of said magnet.

14. Apparatus as recited in claim 11 wherein said displacement measuring device comprises a needle indicator displacement gauge.

15. A hydrostatic leveling system comprising,
a first liquid container,
a second liquid container,
a flexible liquid conduit connecting said containers,
a body of liquid filling said containers and conduit,
a float in each of said containers,
means for restraining said float to permit only substantially vertical movement,
a displacement measuring device arranged with each said container to measure the displacement of said float relative to the bottom of said container, and
a vapor-tight, flexible diaphragm extending between each said float and its respective container wall to seal said liquid and vapor therefrom in said containers, and means in said container for imparting a motion to said float.

16. Apparatus as recited in claim 15 wherein said means for restraining said float includes a downwardly extending cylindrical projection on said float.

17. Apparatus as recited in claim 15 wherein said displacement measuring device comprises a needle indicator precision displacement gauge.

* * * * *